United States Patent
Adwan et al.

(10) Patent No.: US 12,391,249 B2
(45) Date of Patent: Aug. 19, 2025

(54) APPARATUS AND METHOD FOR PROVIDING DRIVER ASSISTANCE OF A VEHICLE

(71) Applicant: JAGUAR LAND ROVER LIMITED, Coventry (GB)

(72) Inventors: Adam Adwan, Coventry (GB); Andrew Lewin, Harbury (GB); Runxiao Ding, Coventry (GB)

(73) Assignee: JAGUAR LAND ROVER LIMITED, Warwickshire (GB)

( * ) Notice: Subject to any disclaimer, the term of this patent is extended or adjusted under 35 U.S.C. 154(b) by 917 days.

(21) Appl. No.: 17/267,731

(22) PCT Filed: Jul. 31, 2019

(86) PCT No.: PCT/EP2019/070650
§ 371 (c)(1),
(2) Date: Feb. 10, 2021

(87) PCT Pub. No.: WO2020/030499
PCT Pub. Date: Feb. 13, 2020

(65) Prior Publication Data
US 2021/0213946 A1    Jul. 15, 2021

(30) Foreign Application Priority Data
Aug. 10, 2018  (GB) .................................... 1813014

(51) Int. Cl.
*B60W 30/095*   (2012.01)
*B60W 30/14*    (2006.01)
(Continued)

(52) U.S. Cl.
CPC ........ *B60W 30/14* (2013.01); *B60W 30/0956* (2013.01); *B60W 50/14* (2013.01);
(Continued)

(58) Field of Classification Search
CPC .. B60W 30/14; B60W 30/0956; B60W 50/14; B60W 2420/42; B60W 2420/52;
(Continued)

(56) References Cited

U.S. PATENT DOCUMENTS 9,063,214 B2    6/2015  Klar et al.
9,784,829 B2   10/2017  Zeng et al.
(Continued)

FOREIGN PATENT DOCUMENTS

CN    101779141 A    7/2010
CN    105467381 A    4/2016
(Continued)

OTHER PUBLICATIONS

Chinese Office Action, with English translation, corresponding to application 201980053781.1, dated Jul. 1, 2023, 24 pages.
(Continued)

*Primary Examiner* — Adam R Mott
*Assistant Examiner* — Byron Xavier Kasper
(74) *Attorney, Agent, or Firm* — TROUTMAN PEPPER LOCKE LLP; Dustin B. Weeks; Nicholas H. Doss

(57) ABSTRACT

Aspects of the present invention relate to an apparatus for providing driver assistance of a vehicle, an autonomous system, a vehicle, a method, a controller and a non-transitory computer readable medium. The apparatus comprises a first sensor and a second sensor mounted on a vehicle. The first sensor is configured to transmit and receive electromagnetic radiation to detect the presence of an object in a first area, and the second sensor is configured to transmit and receive electromagnetic radiation to detect the presence of an object in a second area. The first area and the second area overlap to define an overlapping area forward of the vehicle. The first area extends from the overlapping area to a first extreme direction having a rearward component and a leftward (Continued)

component, and the second area extends from the overlapping area to a second extreme direction having a rearward component and a rightward component.

15 Claims, 10 Drawing Sheets

(51) Int. Cl.
| | |
|---|---|
| *B60W 50/14* | (2020.01) |
| *G01S 13/42* | (2006.01) |
| *G01S 13/58* | (2006.01) |
| *G01S 13/72* | (2006.01) |
| *G01S 13/86* | (2006.01) |
| *G01S 13/87* | (2006.01) |
| *G01S 13/931* | (2020.01) |
| *G01S 17/42* | (2006.01) |
| *G01S 17/66* | (2006.01) |
| *G01S 17/86* | (2020.01) |
| *G01S 17/87* | (2020.01) |
| *G01S 17/931* | (2020.01) |

(52) U.S. Cl.
CPC .......... *G01S 13/426* (2013.01); *G01S 13/931* (2013.01); *G01S 17/86* (2020.01); *G01S 17/931* (2020.01); *B60W 2420/403* (2013.01); *B60W 2420/408* (2024.01); *G01S 2013/9315* (2020.01); *G01S 2013/9321* (2013.01); *G01S 2013/9327* (2020.01)

(58) Field of Classification Search
CPC ...... G01S 13/426; G01S 13/931; G01S 17/86; G01S 17/931; G01S 2013/9315; G01S 2013/9321; G01S 2013/9327; G01S 17/42; G01S 2013/9318; G01S 2013/93185; G01S 2013/9323; G01S 2013/93271; G01S 2013/93274; G01S 13/723; G01S 13/867; G01S 13/878; G01S 17/66; G01S 17/87; G01S 13/589; G01S 2013/93275; G01S 13/87; G01S 2013/93272; G01S 12/865; G01S 12/582; G01S 13/0209; G01S 13/282; G01S 7/40; G01S 13/86; G01S 13/93; G01S 17/93; B60K 31/0008; B60R 2300/301
See application file for complete search history.

(56) References Cited

U.S. PATENT DOCUMENTS

| | | | |
|---|---|---|---|
| 10,026,317 B2 | 7/2018 | Perkins et al. | |
| 10,379,209 B2 | 8/2019 | Kishigami et al. | |
| 10,486,593 B2 | 11/2019 | Ohta | |
| 10,909,391 B2 | 2/2021 | Wang et al. | |
| 2004/0012516 A1* | 1/2004 | Schiffmann | G01S 13/878 342/70 |
| 2005/0062615 A1 | 3/2005 | Braeuchle | |
| 2011/0095937 A1 | 4/2011 | Klar | |
| 2013/0057427 A1 | 3/2013 | Haberland | |
| 2013/0181860 A1* | 7/2013 | Le | G01S 13/931 342/72 |
| 2014/0152473 A1* | 6/2014 | Muhlenberg | G01S 7/2813 340/933 |
| 2016/0162743 A1 | 6/2016 | Chundrlik, Jr. et al. | |
| 2016/0291145 A1* | 10/2016 | Zeng | G08G 1/166 |
| 2017/0212515 A1* | 7/2017 | Bertollini | B60W 50/14 |
| 2017/0248952 A1* | 8/2017 | Perkins | G05D 1/0061 |
| 2017/0249844 A1 | 8/2017 | Perkins et al. | |
| 2017/0369073 A1* | 12/2017 | Huber | B60W 50/00 |
| 2018/0178722 A1 | 6/2018 | Ohta | |
| 2019/0051063 A1* | 2/2019 | Tatourian | G07C 5/0808 |
| 2019/0064934 A1* | 2/2019 | McQuillen | G08G 1/166 |
| 2019/0286924 A1 | 9/2019 | Fujita | |

FOREIGN PATENT DOCUMENTS

| | | | |
|---|---|---|---|
| CN | 106054191 A | 10/2016 | |
| CN | 107117165 A | 9/2017 | |
| CN | 108238056 A | 7/2018 | |
| DE | 102006005501 | 8/2007 | |
| DE | 102006005501 A1 | 8/2007 | |
| DE | 102012006368 A1 | 10/2012 | |
| EP | 2073034 A2 | 6/2009 | |
| EP | 3001218 A2 * | 3/2016 | ......... G01S 13/0209 |
| EP | 3267220 A1 * | 1/2018 | .......... G01S 13/343 |
| WO | WO-2017191201 A1 * | 11/2017 | ............ G01S 13/42 |
| WO | 2018105135 A1 | 6/2018 | |
| WO | 2018105136 A1 | 6/2018 | |

OTHER PUBLICATIONS

European Search Report corresponding to application 24160493.3, dated Jun. 5, 2024, 20 pages.
International Search Report corresponding to International Application No. PCT/EP2019/070650, dated Oct. 29, 2019, 4 pages.
Written Opinion corresponding to International Application No. PCT/EP2019/070650, dated Oct. 29, 2019, 11 pages.
Combined Search and Examination Report corresponding to Application No. GB1813014.6, dated Jan. 10, 2019, 9 pages.
Combined Search and Examination Report corresponding to Application No. GB2018280.4, dated Dec. 21, 2020, 8 pages.

* cited by examiner

APPARATUS AND METHOD FOR PROVIDING DRIVER ASSISTANCE OF A VEHICLE

TECHNICAL FIELD

The present disclosure relates to an apparatus and method for providing driver assistance of a vehicle. In particular, but not exclusively it relates to an apparatus and method for providing driver assistance of a road vehicle in such as a car.

Aspects of the invention relate to an apparatus, an autonomous system, a vehicle, a method, a controller and a non-transitory computer readable medium.

BACKGROUND

Cars with an adaptive cruise control system are known which include a forward facing radar positioned centrally at the front of the car. It is also known to provide a car with radar sensors that face laterally away from the car in order detect vehicles that have a velocity that might cause a collision with the car, so that a front cross traffic alert signal may be produced to provide an alert signal to the user of the car or cause automated braking of the car.

A problem with such arrangements is that each one of the sensors that is used adds cost to the manufacture of the car, due to the cost of the sensor itself, the provision of its mounting and also the manual labor required for its installation. A second potential problem with such an arrangement is that if the forward facing radar becomes unable to provide the necessary detection of objects, for example because it becomes faulty or because its field of view is obscured, the adaptive cruise control becomes unable to function correctly.

It is an aim of the present invention to address one or more of the disadvantages associated with the prior art.

SUMMARY OF THE INVENTION

Aspects and embodiments of the invention provide an apparatus, autonomous system, a vehicle, a method, a controller and non-transitory computer readable medium as claimed in the appended claims.

According to an aspect of the invention there is provided an apparatus for providing driver assistance of a vehicle, the apparatus comprising a first sensor and a second sensor mounted on a vehicle, wherein:
the first sensor is configured to transmit and receive electromagnetic radiation to detect the presence of an object in a first area;
the second sensor is configured to transmit and receive electromagnetic radiation to detect the presence of an object in a second area;
the first area and the second area overlap to define an overlapping area forward of the vehicle;
the first area extends from the overlapping area to a first extreme direction having a rearward component and a leftward component; and
the second area extends from the overlapping area to a second extreme direction having a rearward component and a rightward component, wherein
the first and second sensors are configured to provide a signal to an adaptive cruise control system in dependence on detection of an object in the overlapping area, and
the first and second sensors are is configured to provide a cross traffic alert signal in dependence on detection of an object by the first sensor in the first area but outside of the overlapping area or by the second sensor in the second area but outside of the overlapping area.

According to an aspect of the invention there is provided an apparatus for providing driver assistance of a vehicle, the apparatus comprising a first sensor and a second sensor mounted on a vehicle, wherein: the first sensor is configured to transmit and receive electromagnetic radiation to detect the presence of an object in a first area; the second sensor is configured to transmit and receive electromagnetic radiation to detect the presence of an object in a second area; the first area and the second area overlap to define an overlapping area forward of the vehicle; the first area extends from the overlapping area to a first extreme direction having a rearward component and a leftward component; and the second area extends from the overlapping area to a second extreme direction having a rearward component and a rightward component.

This provides the advantage that signals may be provided that are suitable for driver assistance functions requiring information about other vehicles ahead of the vehicle, such as for adaptive cruise control and/or a high speed autonomous emergency braking system, and signals may be provided that are suitable for a cross traffic alert system by just two sensors.

Optionally, the vehicle has a cabin for receiving users of the vehicle and the first sensor and the second sensor are mounted on the vehicle forward of the cabin.

Optionally, the first sensor is configured to detect the presence of an object within the overlapping area independently of the second sensor, and/or the second sensor is configured to detect the presence of an object within the overlapping area independently of the first sensor. This provides the advantage that if there is a reduction in performance of either of the two sensors, a system such as an adapted cruise control system is still able to operate using signals from the other sensor.

Optionally, the first sensor comprises a radar sensor.
Optionally, the first sensor comprises a lidar sensor.
Optionally, the first sensor is configured to: detect objects in the overlapping area up to a first distance; detect objects in directions outside of the overlapping area only up to a second distance; and the first distance is greater than the second distance. This provides the advantage that power consumption of the sensors may be kept to a minimum while providing required ranges of detection, for example, for an adaptive cruise control system and cross traffic alert system.

Optionally, the first sensor is configured to transmit electromagnetic radiation with a first average power per unit angle in the overlapping area and to transmit electromagnetic radiation with a second average power per unit angle outside of the overlapping area; and the first average power per unit angle is greater than the second average power per unit angle. This provides the advantage that power consumption of the sensors may be kept to a minimum while providing required ranges of detection, for example, for an adaptive cruise control system and cross traffic alert system.

Optionally, the first sensor is configured to: transmit electromagnetic radiation with a first power while transmitting in the overlapping area; transmit electromagnetic radiation with a second power while transmitting in directions outside of the overlapping area; and the first power is greater than the second power.

Optionally, the first sensor is configured to: scan across the overlapping area at a first rate of change of angle; scan outside of the overlapping area at a second rate of change of angle; and the first rate of change of angle is less than the second rate of change of angle.

Optionally, the overlapping area is arranged to include a longitudinal axis of the vehicle.

Optionally, the first extreme direction is at angle of at least 130 degrees to a forward direction along the longitudinal axis of the vehicle. This provides the advantage that a cross traffic alert signal may be generated in respect of other vehicles that are approaching the intended path of the vehicle at a very sharp angle. For example, when the vehicle is attempting to drive out from a parking space Optionally, the overlapping area subtends an angle of at least 10 degrees at the first sensor. This provides the advantage that if an adaptive cruise control system receives signals from both sensors and there is a reduction in performance of either one of the two sensors, the adaptive cruise control system is still able to operate using signals from the other sensor.

According to another aspect of the invention there is provided an autonomous system for a vehicle, the autonomous system comprising the apparatus of any one of the previous paragraphs and a controller configured to provide output signals for controlling speed of the vehicle in dependence on detection of an object in the overlapping area by the first sensor and/or the second sensor, wherein the autonomous system comprises an adaptive cruise control system, and the controller is configured to provide a cross traffic alert signal in dependence on detection of an object by the first sensor in the first area but outside of the overlapping area or by the second sensor in the second area but outside of the overlapping area.

According to another aspect of the invention there is provided an autonomous system for a vehicle, the autonomous system comprising the apparatus of any one of the previous paragraphs and a controller configured to provide output signals for controlling speed of the vehicle in dependence on detection of an object in the overlapping area by the first sensor and/or the second sensor.

Optionally, the autonomous system comprises an adaptive cruise control system.

Optionally, the autonomous system comprises an adaptive cruise control system with steer assist.

Optionally, the first and second sensors are of a first type; the system comprises a third sensor of a second type; and the controller is configured to perform sensor fusion by combining received first data indicative of an object detected by the first sensor and/or the second sensor and second data received from the third sensor. This provides the advantage that objects may be more accurately tracked and/or objects may continue to be tracked by the third sensor when they are out of the field of view of the first and second sensors.

Optionally, the third sensor comprises a camera.

Optionally, the controller is configured to: receive data indicative of a first distance of a first object from the first sensor; receive data indicative of second distance of the first object from the second sensor; and determine a distance from the vehicle to the first object in dependence on trilateration. This provides the advantage that a more accurate angular position of an object may be determined.

Optionally, the controller is configured to: provide a cross traffic alert signal in dependence on detection of an object by the first sensor in the first area but outside of the overlapping area or by the second sensor in the second area but outside of the overlapping area.

According to a further aspect of the invention there is provided a vehicle comprising the apparatus of any one of the previous paragraphs or the autonomous system of any one the previous paragraphs.

According to yet another aspect of the invention there is provided a method of providing driver assistance of a vehicle, the method comprising:
transmitting and receiving electromagnetic radiation to detect the presence of an object in a first area; and
transmitting and receiving electromagnetic radiation to detect the presence of an object in a second area;
wherein:
the first area and the second area overlap to define an overlapping area forward of the vehicle;
the first area extends from the overlapping area to a first extreme direction having a rearward component and a leftward component; and
the second area extends from the overlapping area to a second extreme direction having a rearward component and a rightward component wherein
the detection of the presence of an object in the overlapping area causes a signal to be provided to an adaptive cruise control system, and
the detection of the presence of an object in the first or the second area but outside the overlapping area causes a cross traffic alert signal to be provided.

According to yet another aspect of the invention there is provided method of providing driver assistance of a vehicle, the method comprising: transmitting and receiving electromagnetic radiation to detect the presence of an object in a first area; and transmitting and receiving electromagnetic radiation to detect the presence of an object in a second area;
wherein: the first area and the second area overlap to define an overlapping area forward of the vehicle; the first area extends from the overlapping area to a first extreme direction having a rearward component and a leftward component; and the second area extends from the overlapping area to a second extreme direction having a rearward component and a rightward component.

According to a yet further aspect of the invention there is provided an autonomous system for a vehicle, the autonomous system comprising: a first sensor configured to transmit and receive electromagnetic radiation to detect the presence of an object in a first area; a second sensor configured to transmit and receive electromagnetic radiation to detect the presence of an object in a second area; and at least one controller configured to: provide an adaptive cruise control function for a vehicle in dependence on detection of an object by the first sensor and in dependence on detection of an object by the second sensor; and provide a cross traffic alert signal in dependence on detection of an object by the first sensor and in dependence on detection of an object by the second sensor. This provides the advantage that the autonomous system is able to provide adaptive cruise control and a cross traffic alert system using just two sensors. Furthermore, provided the first sensor and the second sensor are mounted on a vehicle so that the first area and the second area form an overlapping area ahead of the vehicle, the adaptive cruise control system is still able to operate if there is a reduction in performance of either of the two sensors.

Optionally, the first area subtends an angle of at least 95 degrees at the first sensor and the second area subtends an angle of at least 95 degrees at the second sensor.

Optionally, the first area comprises a first subsidiary area and a second subsidiary area; the second area comprises a first subsidiary area and a second subsidiary area; and the at least one controller is configured to: provide the autonomous cruise control function for the vehicle in dependence on detection of an object by the first sensor in the first subsidiary area of the first area and in dependence on detection of an object by the second sensor in the first subsidiary area of the second area; and provide the cross traffic alert signal in dependence on detection of an object by the first sensor in the second subsidiary area of the first area and provide a cross traffic alert signal in dependence on detection of an object by the second sensor in the second subsidiary area of the second area.

According to a yet further aspect of the invention there is provided a method of controlling a vehicle comprising: receiving a first sensor signal produced by a first sensor configured to transmit and receive electromagnetic radiation to detect the presence of an object in a first area; receiving a second sensor signal produced by a second sensor configured to transmit and receive electromagnetic radiation to detect the presence of an object in a second area; providing an adaptive cruise control function for a vehicle in dependence on the first signal and/or in dependence on the second signal; and providing a cross traffic alert signal in dependence on the first signal and in dependence on the second signal.

Optionally, the method comprises: providing the adaptive cruise control function for the vehicle in dependence on indications in the first signal relating to a first subsidiary area of the first area and in dependence on indications in the second signal relating to a first subsidiary area of the second area; providing the cross traffic alert signal in dependence on the first signal being indicative of a detected object in a second subsidiary area of the first area; and providing a cross traffic alert signal in dependence on the second signal being indicative of a detected object in a second subsidiary area of the second area.

According to another aspect of the invention there is provided at least one controller comprising:
- at least one electronic processor having an electrical input for receiving a first signal indicating detection of the presence of an object in the first area and a second signal indicating detection of the presence of an object in the second area, and
- at least one electronic memory device electrically coupled to the electronic processor and having instructions stored therein, and
- a non-transitory computer readable medium comprising computer readable instructions, wherein
- the processor is configured to access the memory device and/or the non-transitory computer readable medium and execute the instructions stored therein such that it is operable to perform the method of any one of the previous paragraphs.

According to another aspect of the invention there is provided at least one controller comprising at least one electronic processor having an electrical input for receiving the first signal and the second signal and at least one electronic memory device electrically coupled to the electronic processor and having instructions stored therein, wherein the processor is configured to access the memory device and execute the instructions stored therein such that it is operable to perform the method of any one of the previous paragraphs.

According to another aspect of the invention there is provided a non-transitory computer readable medium comprising computer readable instructions that, when executed by a processor, cause performance of a method according to any one of the previous paragraphs.

According to yet another aspect of the invention there is provided an autonomous system for a vehicle, the autonomous system comprising: a first sensor configured to transmit and receive electromagnetic radiation to determine a distance from the first sensor to an object in a first area; a second sensor configured to receive electromagnetic radiation transmitted by the first sensor to determine a distance from the first sensor to the second sensor via the object in the first area; and a controller configured to determine an angular position of the object from the first distance and the second distance.

According to yet another aspect of the invention there is provided an autonomous system for a vehicle, the autonomous system comprising: a first sensor for mounting on a vehicle, the first sensor configured to transmit and receive electromagnetic radiation to detect the presence of an object in a first area; a second sensor for mounting on a vehicle, the second sensor configured to receive electromagnetic radiation transmitted by the first sensor to detect the object in the first area; and a controller configured to determine an angular position of the object by trilateration.

This provides the advantage of accurate angular positions of an object by sensors that are capable of accurate distance measurement but which have insufficient angular resolution.

The apparatus may be for use within a road vehicle such as a car.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A vehicle 100, apparatus 106, system, method 1000, controller 802 and non-transitory computer readable medium 901 in accordance with an embodiment of the present invention is described herein with reference to the accompanying Figures.

Figure 1:
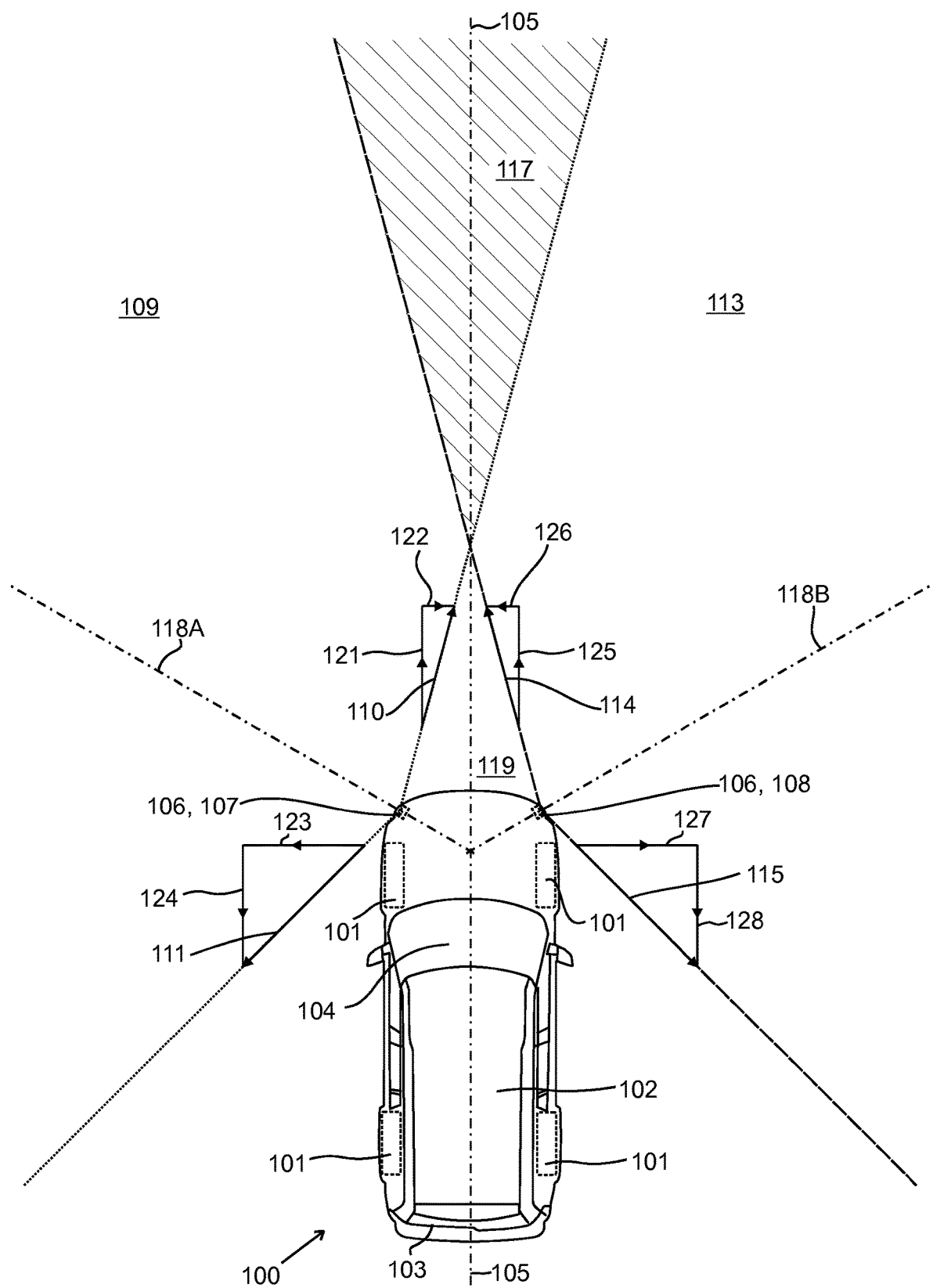
FIG. 1 shows a top view of a vehicle.

With reference to FIG. 1, the vehicle 100 is a road vehicle in the form of a car having four road wheels 101 and a cabin 102 arranged to accommodate users of the vehicle 100. The cabin 102 extends from a rear window 103 located towards the rear end of the vehicle 100 to a windshield 104, that is nearer to the front end of the vehicle 100.

The vehicle 100 has a longitudinal axis 105 extending through its middle from the rear to the front of the vehicle 100, and in normal use, the vehicle 100 travels in a forward direction along the longitudinal axis 105.

The vehicle 100 also includes apparatus 106 comprising a first sensor 107 and a second sensor 108. The first sensor 107 is configured to transmit and receive electromagnetic radiation to detect the presence of an object in a first area 109 within a field of view from the first sensor 107 that extends between a first overlapping direction 110 and a first extreme direction 111. With respect to the vehicle 100, the first overlapping direction 110 comprises a forward component 121 and a rightward component 122, and the first extreme direction 111 comprises a leftwards component 123 and a rearwards component 124.

Similarly, the second sensor 108 is configured to transmit and receive electromagnetic radiation to detect the presence of an object in a first area 113 within a field of view from the second sensor 108 that extends between a second overlapping direction 114 and a first extreme direction 115. With respect to the vehicle 100, the second overlapping direction 114 comprises a forward component 125 and a leftward component 126, and the second extreme direction 115, comprises a rightwards component 127 and a rearwards component 128.

The first area 109 and the second area 113 overlap to define an overlapping area 117 (which has been hatched in FIG. 1) that is forward of the vehicle 100. In the present embodiment, the sensors 107 and 108 each have a field of view that extends 75° to each side of their respective central axes 118A and 118B. The first sensor 107 is mounted on the vehicle 100 to the left of its longitudinal axis 105 and with the central axis 118A of the first sensor 107 directed typically about 60° around to the left from the longitudinal axis 105 of the vehicle 100. Similarly, the second sensor 108 is mounted on the vehicle 100 to the right of its longitudinal axis 105 and with the central axis 118B of the second sensor 108 directed typically about 60° around to the right from the longitudinal axis 105 of the vehicle 100. Consequently, the overlapping area 117 extends 15° either side of the longitudinal axis 105 of the vehicle 100. This installation angle can be as small as 45°, leading to an overlap angle of 30° either side of the longitudinal axis 105.

In alternative embodiments the overlapping area 117 may extend either side of the longitudinal axis 105 of the vehicle 100 by more than 15° or less than 15°, due to the central axes 118A and 118B being at an angle other than 60° to the longitudinal axis 105 of the vehicle 100 and/or the field of view of the sensors 107 and 108 being less than or greater than 150°. In some alternative embodiments the overlapping area 117 extends to either side of the longitudinal axis 105 of the vehicle 100 by about 5°.

Because the first sensor 107 has a field of view of 150° and its central axis 118A is at 60° to the longitudinal axis 105 of the vehicle 100, the first area 109 extends leftwards around from the overlapping area 117 to the first extreme direction 111, which is at 135° (=60°+150°/2) to the longitudinal axis 105 of the vehicle 100. I.e. the first extreme direction is at 45° to a rearward direction of the vehicle 100. By similar reasoning, the second area 113 extends rightwards around from the overlapping area 117 to the second extreme direction 115 which is at 135° to the longitudinal axis 105 of the vehicle 100.

In alternative embodiments, the angle between each of the first and second extreme directions 111 and 115 and the longitudinal axis is less than 135° but in each of these embodiments the first and second extreme directions 111 and 115 still have a rearwards component 124, 128.

In some of these embodiments, the angle between each of the first and second extreme directions 111 and 115 and the longitudinal axis is at least 130°. In other alternative embodiments, the field of view of each sensor 107 and 108 is substantially less than 150° and may be as small as 95°. In some of these embodiments, the first overlapping direction 110 may make a very small angle, such as about 10° with the second overlapping direction 114.

Figure 2:
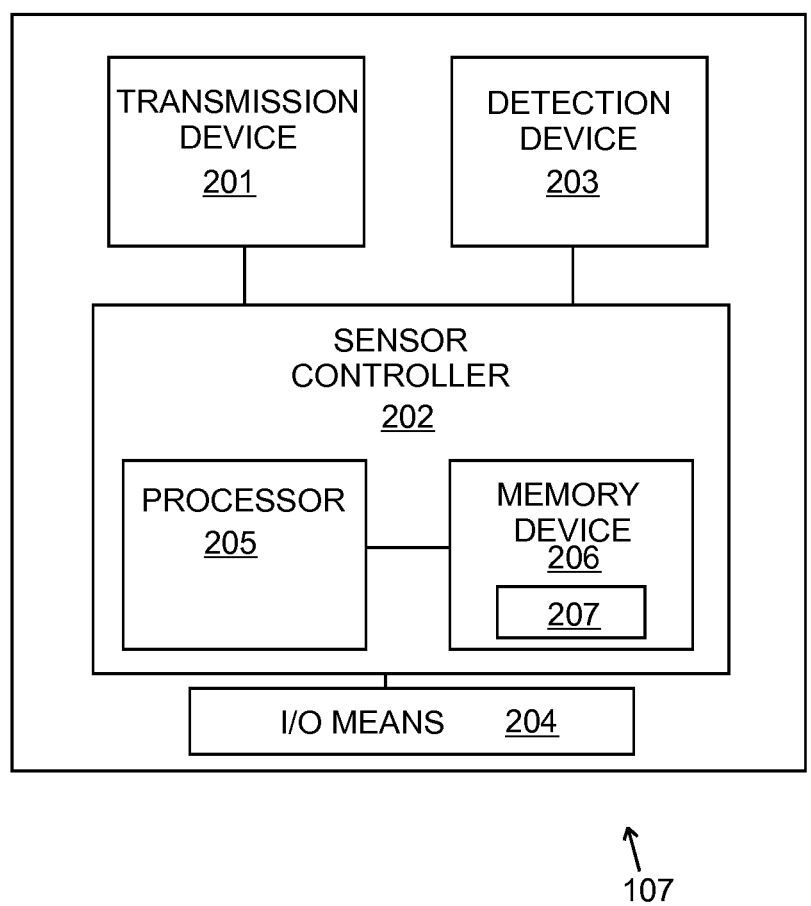
FIG. 2 shows schematically a sensor of the vehicle of FIG. 1.

The sensor 107 is shown schematically in FIG. 2. The sensor 108 may have a similar configuration to that of sensor 107.

In the present embodiment, the sensor 107 is a radar device comprising a transmission device 201 configured to transmit pulses of radio waves in directions within the field of view of the sensor 107, under the control of a sensor controller 202. The sensor 107 also comprises a detection device 203 configured to detect radio waves that are transmitted by the transmission device 201 and which are reflected back to the sensor 107 from objects within the field of view. The sensor controller 202 is arranged to analyse signals received by the detection device 203 to determine the range, direction (bearing or azimuth angle) and velocity of detected objects, and provide output signals indicative of the distance to detected objects, their angular position and velocity.

The sensor 107 may include an input/output means 204 to enable output signals indicative of the distance to detected objects, their angular position and velocity to be provided to other components of the vehicle 100. The input/output means 204 may comprise a data bus such as a high speed CAN (Controller Area Network) bus.

The sensor controller 202 may comprise a memory device 206, which stores instructions 207, and a processor 205 configured to access the memory device 206 and execute the stored instructions 207 so that the processor is operable to control transmission by the transmission device 201 and analyse signals received from the detection device 203.

In an alternative embodiment, the sensors 107 and 108 are lidar (light detection and ranging) devices comprising a transmission device 201 in the form of scanning laser device and one or more light detection devices 203 configured to detect reflected laser light. However, in each embodiment, the sensors 107 and 108 are configured to transmit pulses of electromagnetic radiation (i.e. pulses of radio waves in the embodiment of FIG. 2, or pulses of infrared or light from lasers in embodiments comprising lidar) and configured to sense the reflected electromagnetic radiation in order to detect objects that are present within their fields of view.

In some alternative embodiments, the radar (or lidar) sensors 107 and 108 operate in a system using a continuous wave technique such as frequency modulated continuous wave (FMCW) or phase modulated continuous wave (PMCW) to enable range and velocity to be determined as required.

In embodiments in which the sensors 107 and 108 are radar sensors, the detection device 203 may comprise multiple radar receivers and phase differences between multiple radar receivers may be used to scan through a range of angles to determine angle of arrival of the radio signal. Such a detection device 203 may be used in co-operation with a transmission device 201 that includes several (e.g. four) transmitters that transmit into different areas one after the other. Alternatively, the sensors 107 and 108 may comprise a transmission device 201 arranged to use digital beamforming techniques that are related to a phased array arrangement in order to scan though a range of transmission directions. Thus, it will be understood that scanning by the radar sensors may be performed electronically by the transmission device 201 and/or the detection device 203.

It may be noted that three or more consecutive detections of an object may be required by the radar sensors 107 and 108 to determine a track which represents location, speed and direction of a detected object.

In some embodiments, the sensor controller 202 is arranged to cause the transmission device 201 to transmit pulses of electromagnetic radiation at the same power in each of the various angles at which it transmits, and also to scan through the various angles at a constant rate of change of angle. Thus, the sensor 107 is arranged to have the same power and range of detection across its entire field of view. However, the overlapping fields of view of the sensors 107 and 108 provide the advantage of offering two redundant channels which enhance the detection probability of an object. For example, if each sensor (107 or 108) has a 90% probability of detection (10% chance of a miss), the two combined channels have a 99% probability of detection (1% chance of a miss) if the detections are statistically independent.

However, in the present embodiment, the sensor controller 202 controls the transmission device 201 to transmit electromagnetic radiation with a first average power per unit angle in the overlapping area 117 and to transmit electromagnetic radiation with a second average power per unit angle in directions outside of the overlapping area 117. The first average power per unit angle is arranged to be greater than the second average power per unit angle so that the range of detection by the first sensor 107 is relatively long within the overlapping area 117 and relatively short outside of the overlapping area 117.

In a similar manner, the second sensor 108 is arranged to transmit electromagnetic radiation with a first average power per unit angle in the overlapping area 117 and to transmit electromagnetic radiation with a second average power per unit angle in directions outside of the overlapping area 117. The first average power per unit angle is arranged to be greater than the second average power per unit angle so that the range of detection by the second sensor 108 is relatively long within the overlapping area 117 and relatively short outside of the overlapping area 117.

Figure 3:
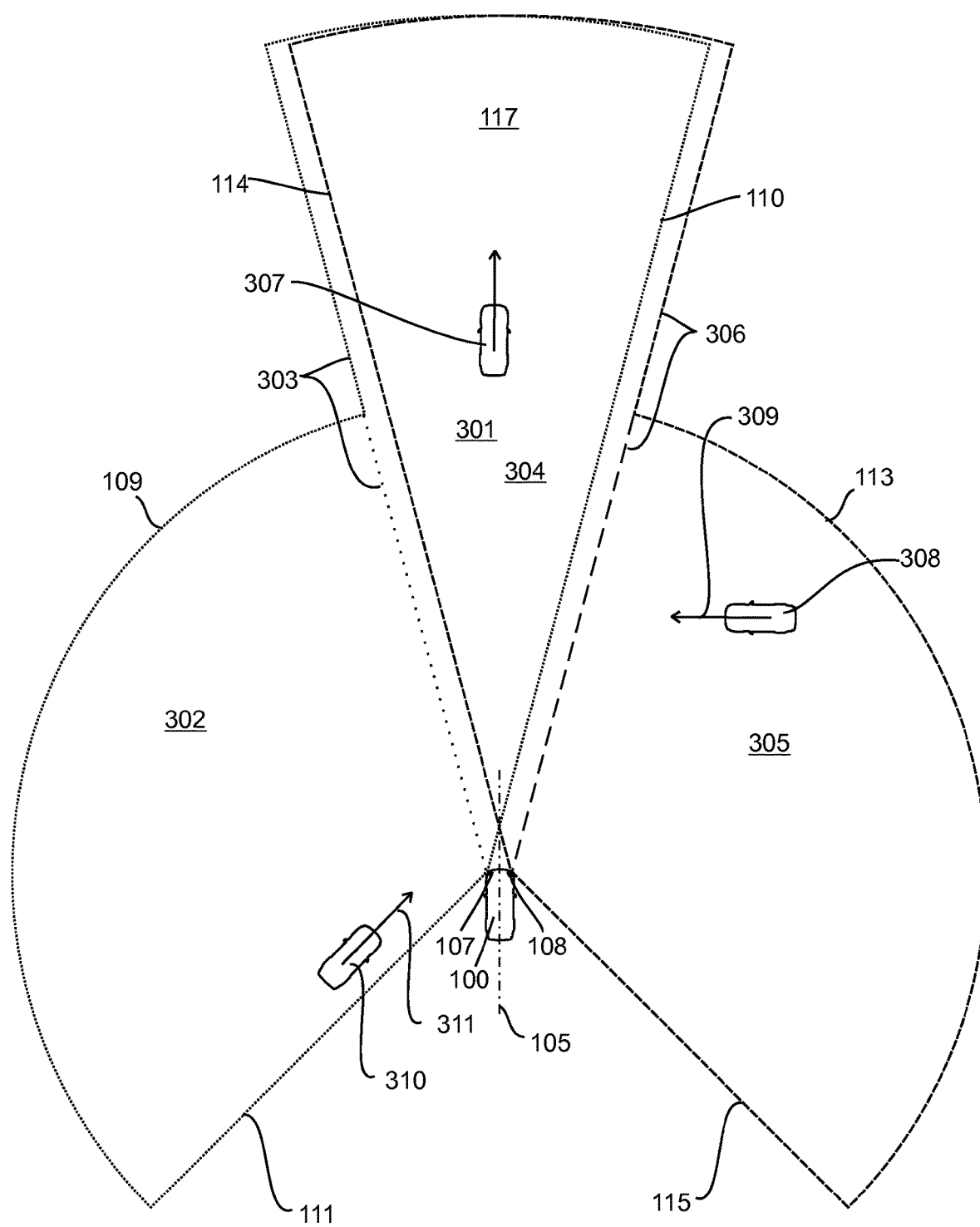
FIG. 3 shows a top view of the vehicle, a first area scanned by a first sensor and a second area scanned by a second sensor.

A top view of the vehicle 100, the first area 109 scanned by the first sensor 107 and the second area 113 scanned by the second sensor 108 is shown in FIG. 3. The first area 109 (which is bounded by a dotted line in FIG. 3) is divided into two subsidiary areas 301 and 302. The first subsidiary area 301 of the first area 109 extends between the first overlapping direction 110 and a first intermediate direction 303, so that it encompasses the overlapping area 117.

Similarly, the second area 113 (which is bounded by a dashed line in FIG. 3) is divided into two subsidiary areas 304 and 305. The first subsidiary area 304 of the second area 113 extends between the second overlapping direction 114 and a second intermediate direction 306, so that it also encompasses the overlapping area 117.

In the embodiment of FIG. 3, the first and second sensors, 107 and 108 are arranged to detect objects up to a distance of about 160 metres within their first subsidiary areas 301 and 304, and only detect objects up to a distance of about 60 metres within their second subsidiary areas 302 and 305. In an embodiment in which the sensors 107 and 108 are radar sensors, each of the sensors 107 and 108 comprises at least two different antennas which have different radiation patterns, and the drive power is sequenced through the different antennas to provide a broad angle short range transmission beam and a narrow angle long range transmission beam.

The relatively long range of the sensors 107 and 108 in their first subsidiary areas 301 and 304 provides sufficiently long range of detection for an adaptive cruise control system 805 (shown in FIG. 8) of the vehicle 100 for controlling the speed of the vehicle 100. Thus, for example, the vehicle 100 may be arranged to maintain a suitable speed and distance behind another vehicle 307 that is travelling ahead of the vehicle 100.

The relatively shorter range of the sensors 107 and 108 within their second subsidiary areas 302 and 305 provides sufficiently long range of detection to enable a cross traffic alert signal to be generated in respect of other vehicles that may be about to cross the path of the vehicle 100. For example, when the vehicle 100 approaches a road junction where another vehicle 308 is approaching the same junction from the right (or left) of the vehicle 100 so that its path might cross that of the vehicle 100, the other vehicle 308 and its velocity 309 are detected by the sensor 108 (or the sensor 107) and a signal providing a cross traffic alert may be generated.

Alternatively, the vehicle 100 may be moving out from a parking space between other parked vehicles such that the view of the user of the vehicle 100 is restricted. The sensors 107 and 108 may provide signals indicative of other detected vehicles that might pass in front of the vehicle 100. For example, in FIG. 3 another vehicle 310 has a velocity 311 that is incident with the intended path of the vehicle 100. The direction of travel of the other vehicle 309 is approximately 45° to the direction of travel of the vehicle 100, but because the first area extends up to 135° from the longitudinal axis 105 of the vehicle 100, the sensor 107 is able to detect the presence and motion of the other vehicle 309.

The reduced average power per unit angle of the first and second sensors 107 and 108 when scanning their second subsidiary areas 302 and 305, compared to their average power per unit angle when scanning their first subsidiary areas 301 and 304, enables the sensors 107 and 108 to use less energy overall.

In some embodiments, the first and second sensors 107 and 108 may be arranged to operate to detect objects only within their second subsidiary areas 302 and 305 when the vehicle 100 is travelling at a relatively high speed, i.e. above a threshold speed or within a higher speed range, for example above 30 kph or in the range 30 kph to 180 kph. Hence, the adaptive cruise control functions is only made available at relatively high speeds. Similarly, the first and second sensors 107 and 108 may be arranged to operate to detect objects at least within their first subsidiary areas 301 and 304 only when the vehicle is travelling at a relatively low speed, i.e. at speeds below an upper value, for example 5 kph or 10 kph, such that the cross traffic alert function is only operable at lower speeds. Alternatively both functions may be available at all speeds, or within overlapping speed ranges.

The examples provided in FIG. 3 illustrate that just two sensors 107 and 108 that are configured as described above are able to provide the necessary detection for an adaptive cruise control system as well as providing cross traffic alerts in respect of other vehicles approaching the path in front of the vehicle 100 from the left and the right.

Another advantageous feature of the present embodiment is that the sensors 107 and 108 are disposed at positions separated from each other on opposing sides of the longitudinal axis 105 of the vehicle 100. Consequently, at times when another vehicle is positioned directly in front of the vehicle 100, it is possible for one or other of the sensors 107 and 108 to detect other objects on or near the proposed path of the vehicle 100 that would have been obscured from detection if only a single forward facing sensor positioned on the longitudinal axis 105 of the vehicle 100 had been used.

Figure 4:
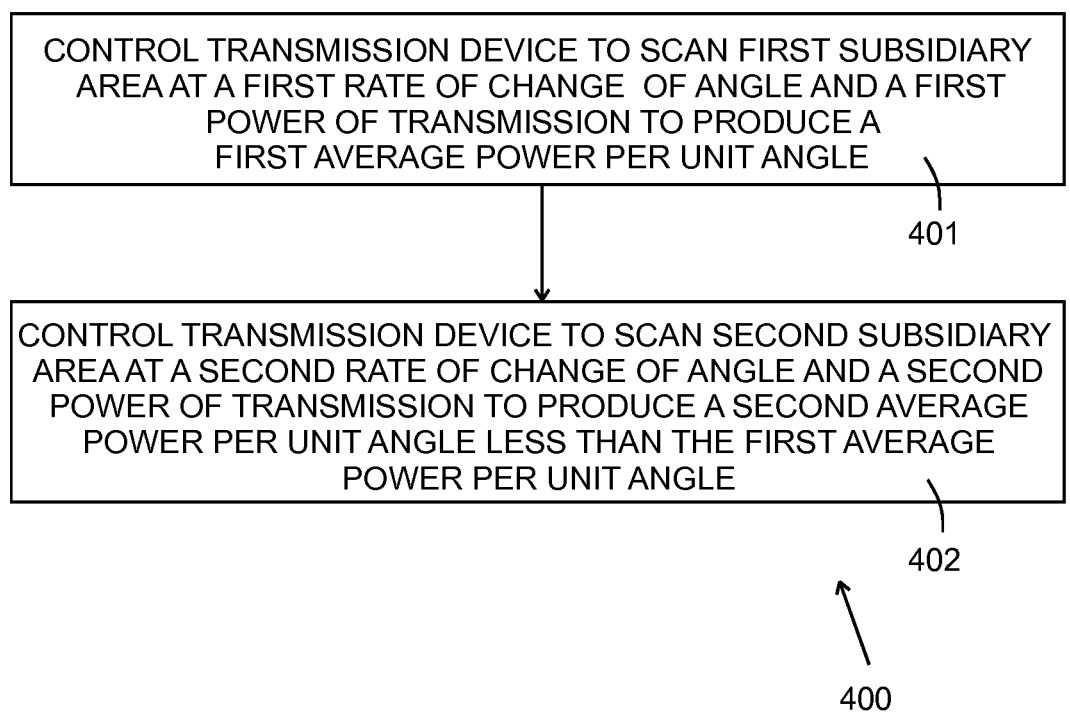
FIG. 4 shows a flowchart that illustrates a method performable by a sensor controller.

A method 400 performable by the sensor controller 202 (shown in FIG. 2) of the sensor 107, to achieve the relatively long range detection by the sensor 107 in the overlapping area 117 at the front of the vehicle 100, while using less power when providing detection of cross traffic to the sides of the vehicle 100, is illustrated by the flowchart shown in FIG. 4. At block 401 of the method 400 the transmission device 201 is controlled to scan the first subsidiary area 301 of the first area 109 at a first rate of change of angle and a first power of transmission. The first rate of change of angle and the first power of transmission are selected to provide a first average power of transmission per unit angle subtended by the first area 301. The first subsidiary area 301 is arranged to contain the overlapping area 117.

At block 402, the transmission device 201 is controlled to scan a second subsidiary area 302 of the first area 109 at a second rate of change of angle and a second power of transmission. The second rate of change of angle and a second power of transmission are selected to provide a second average power of transmission per unit angle subtended by the second area 302. The first and second rates of change of angle and the first and second power of transmission are selected so that the first average power per unit angle is greater than the second average power per unit angle.

Figure 5:
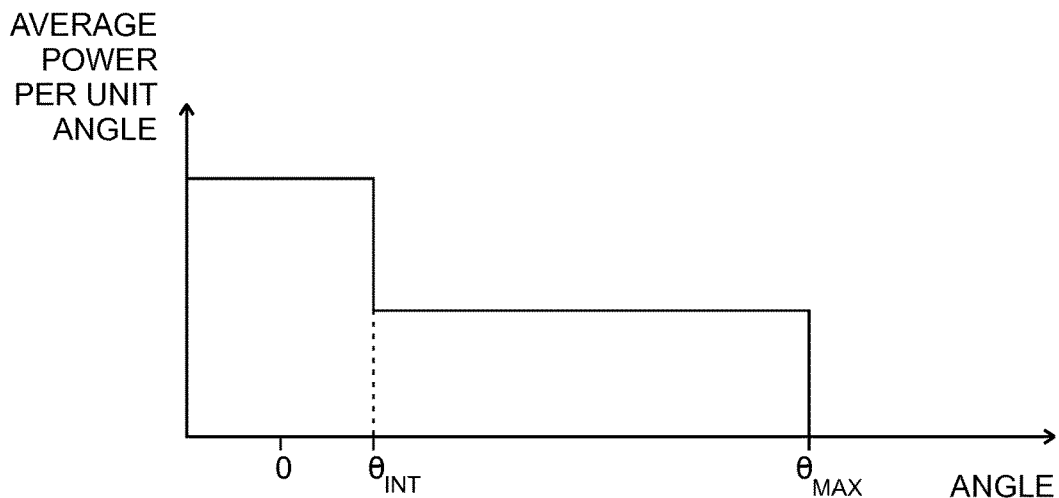
FIG. 5 shows a graph of the average power per unit angle of electromagnetic radiation transmitted by the first sensor with respect to the angle of transmission.

A graph illustrating this is shown in FIG. 5, which shows the average power per unit angle of electromagnetic radiation transmitted by the first sensor 107 with respect to the angle of transmission. In this graph the angle "0" represents a direction along the longitudinal axis 105 of the vehicle 100, "$\theta_{MAX}$" represents the first extreme direction 111 and "$\theta_{INT}$" represents the intermediate direction 303.

Figure 6:
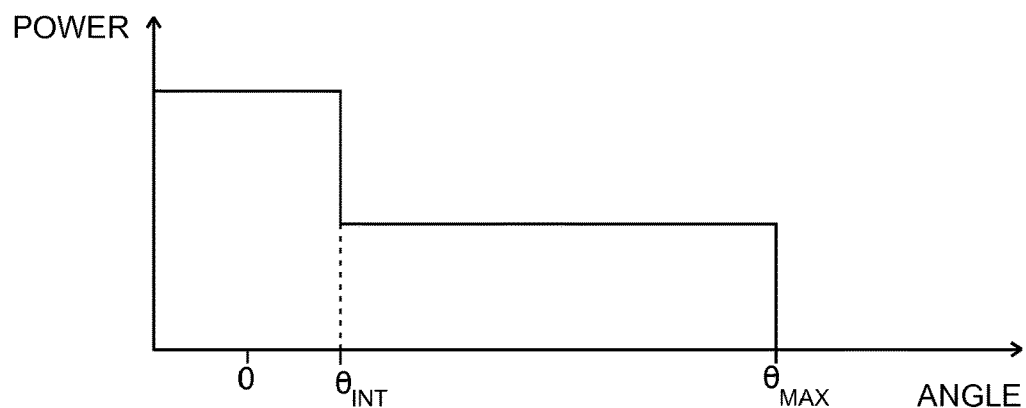
FIG. 6 shows a graph of transmission power of a sensor against angle of transmission.

A graph of transmission power against angle of transmission, which illustrates a first way in which this may be achieved, is shown in FIG. 6. In this instance, the transmission device 201 is arranged to scan between the first overlapping direction and the first extreme direction 111 at a constant rate of change of angle but with a higher power output in the first subsidiary area 301 when compared to the second subsidiary area 302.

Figure 7:
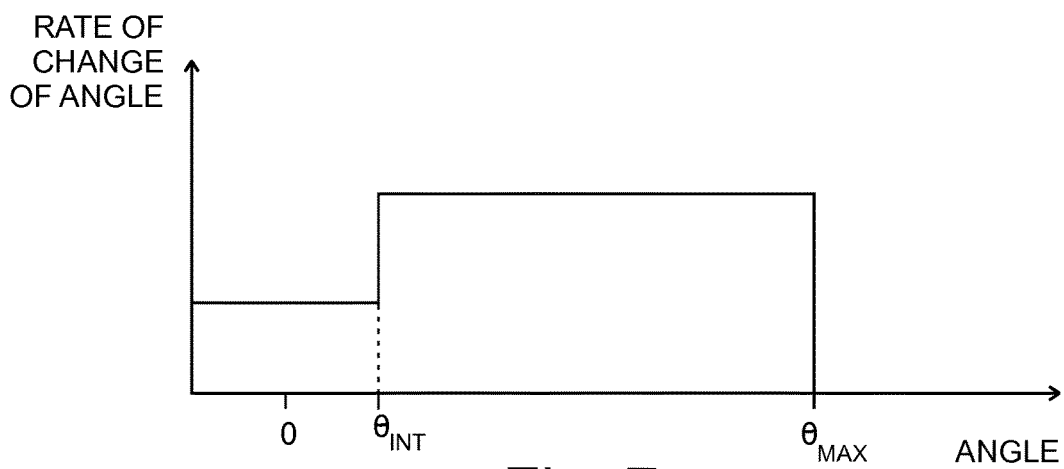
FIG. 7 shows a graph of rate of change of angle of transmission of a sensor against angle of transmission.

A graph of rate of change of angle against angle of transmission, which illustrates a second way in which this may be achieved is shown in FIG. 7. In this instance, the transmission device 201 is arranged to scan between the first overlapping direction and the first extreme direction 111 at a constant power output but with a lower rate of change of angle in the first subsidiary area 301 when compared to the second subsidiary area 302.

Figure 8:
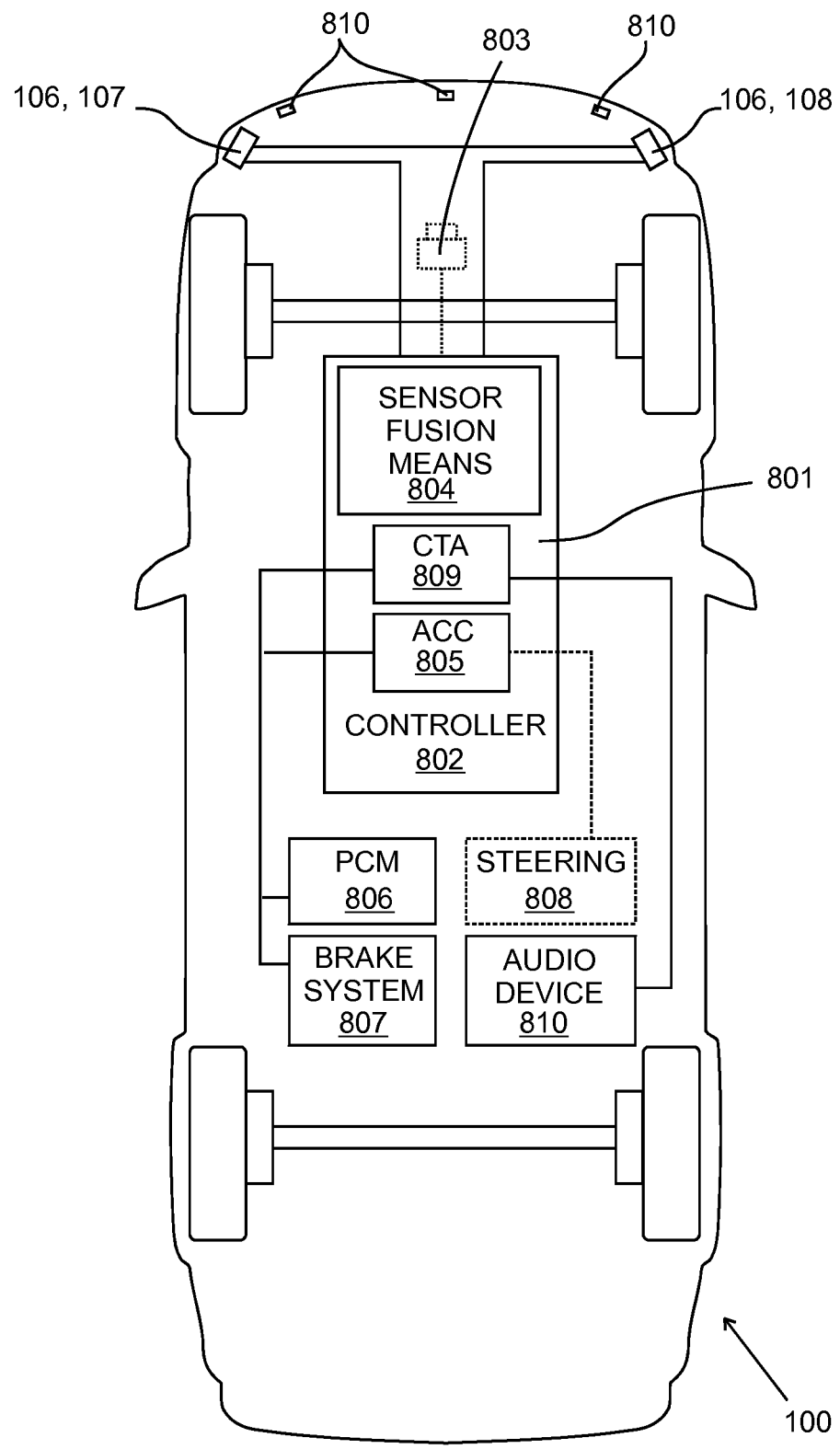
FIG. 8 shows a schematic diagram of the vehicle including selected components.

A schematic diagram of the vehicle 100 including selected components is shown in FIG. 8. In the present embodiment, the vehicle 100 comprises an autonomous system 801 for providing automated control of movement of the vehicle 100. The autonomous system 801 comprises the apparatus 106 and at least one autonomous system controller 802 that is configured to receive signals from the sensors 107 and 108. In the present embodiment the controller 802 provides a sensor fusion means 804 arranged to provide data fusion in respect of data received from the sensors 107 and 108.

In some embodiments, the autonomous system controller 802 is also configured to receive signals from a third sensor 803 of a different type to the first and second sensors 107 and 108. In the present embodiment the third sensor 803 is a forward facing camera 803, and the sensor fusion means 804 is arranged to provide data fusion in respect of data received from the sensors 107 and 108 and the camera 803. Data received from the third sensor 803 enables the sensor fusion means 804 to more accurately track objects identified by the sensors 107 and 108 and/or continue to track objects when they enter an area (119 shown in FIG. 1) located between the first overlapping direction 110 and the second overlapping direction 114 that is not within either of the fields of view of the first and second sensors 107 and 108.

In some embodiments, the vehicle 100 comprises one or more PDC (Parking Distance Controller) sensors 810 (such as ultrasonic parking sensors) positioned to detect objects in front of the vehicle 100 and the sensor fusion means 804 is arranged to provide data fusion in respect of data received from the sensors 107 and 108, the PDC sensors 810 and optionally the camera 803. Data from the PDC sensors 810 provides information relating to objects that are a relatively short distance in front of the vehicle 100, and in particular may provide useful information relating to objects in front of the vehicle 100 and in the area 119 (shown in FIG. 1) located between the fields of view of the two sensors 107 and 108. The use of information from the PDC sensors 810 may be particularly relevant for use in a stop and go (or queue assist) function in stop/start scenarios in queueing traffic.

The controller 802 comprises an adaptive cruise control system (ACC) 805 configured to automatically control the speed of the vehicle 100 to maintain a safe distance from vehicles that are ahead. To achieve this, the adaptive cruise control system 805 provides output signals to a powertrain control module (PCM) 806, and/or a brake system 807, in dependence on signals received from the sensor 107, and/or the sensor 108, indicative of vehicles detected in the overlapping area 117. The adaptive cruise control system 805 may also be configured to provide signals to cause a power steering unit 808 to provide steering assist.

In the present embodiment, the controller 802 is arranged to receive first and second signals directly from the first and second sensors 107 and 108, and therefore if either of those sensors 107 and 108 fails to function correctly, the controller 802 may still receive signals from the other one of those sensors 107 and 108 in order to provide the adaptive cruise control function. In alternative embodiments, one sensor 107 (or 108) acts as master and the other sensor 108 (or 107) acts as a slave. The master sensor 107 (or 108) receives signals indicative of detected objects from the slave sensor 108 (or 107) and then provides a signals to the controller 802 from the master sensor based on detections by both sensors 107 and 108.

Optionally, a direct data connection may be provided between the sensors 107 and 108 so that the sensor controller 202 of one (or both) of the sensors 107 or 108 is able to receive data relating to detected objects from the other one of the sensors 107 and 108 and perform a data fusion process. The sensor controller 202 is then able to provide a signal indicative of detected objects to the controller 802 that is based on sensing by both of the sensors 107 and 108.

The autonomous system controller 802 also comprises a cross traffic alert system 809 configured to provide a cross traffic alert signal in dependence on a signal received from the first sensor 107 indicative of detection of an object that is in the first area 109 but outside of the overlapping area 117 and which is moving towards the longitudinal axis 105 ahead of the vehicle 100. The cross traffic alert system 809 is also configured to provide a cross traffic alert signal in dependence on a signal received from the second sensor 108 indicative of an object that is in the second area 113 but outside of the overlapping area 117 and which is moving towards the longitudinal axis 105 ahead of the vehicle 100. The cross traffic alert signal may be output to the powertrain control module 806 and/or the brake system 807 to cause the speed of the vehicle 100 to be automatically reduced to prevent a collision. Additionally or alternatively, the cross traffic alert signal may be output to an audio device 809 configured to provide an audio alert to the user of the vehicle 100.

Figure 9:
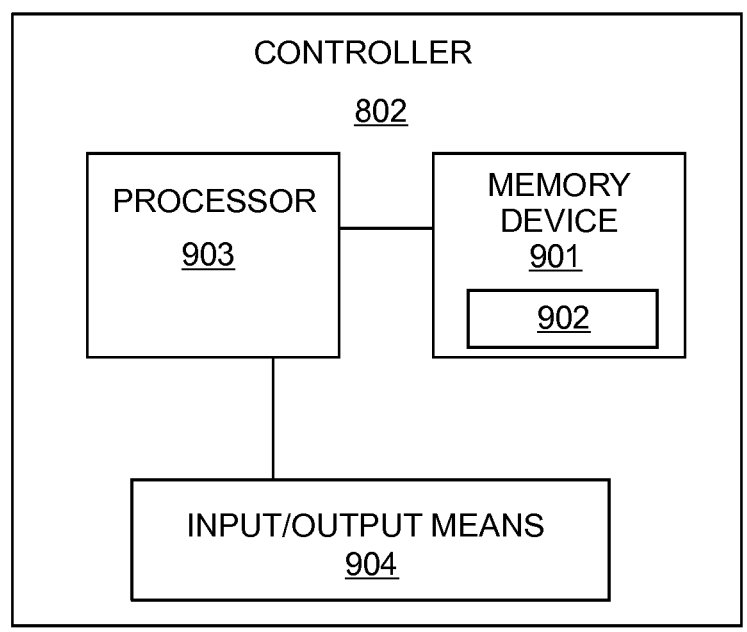
FIG. 9 shows components of a controller.

Components of the autonomous system controller 802 are shown in FIG. 9. The controller 802 comprises at least one memory device 901 for storing instructions 902, and it also comprises at least one processor 903 configured to access the instructions stored in the at least one memory device 901, which when executed by the processor 903 cause it to perform the functions of the adaptive cruise control system 805 and the cross traffic alert system 809. The controller 802 also comprises an input/output means 904 configured to enable the controller 902 to receive signals from the sensors 107 and 108 and to provide output signals to the powertrain control module 806 and the brake system 807. In the present embodiment, the input/output means 904 comprises a transceiver for providing data over a CAN (Controller Area Network) bus but in other embodiments the data may be communicated via a local area network (LAN) such as 100 Mbps Ethernet.

In the present embodiment the autonomous system controller 802 is separate from the sensors 107 and 108. However, it will be appreciated that, in alternative embodiments, at least some of the processing described as being performed by the controller 802 may be performed by processing means (205 shown in FIG. 2) provided at the sensor 107 and/or the sensor 108.

Figure 10:
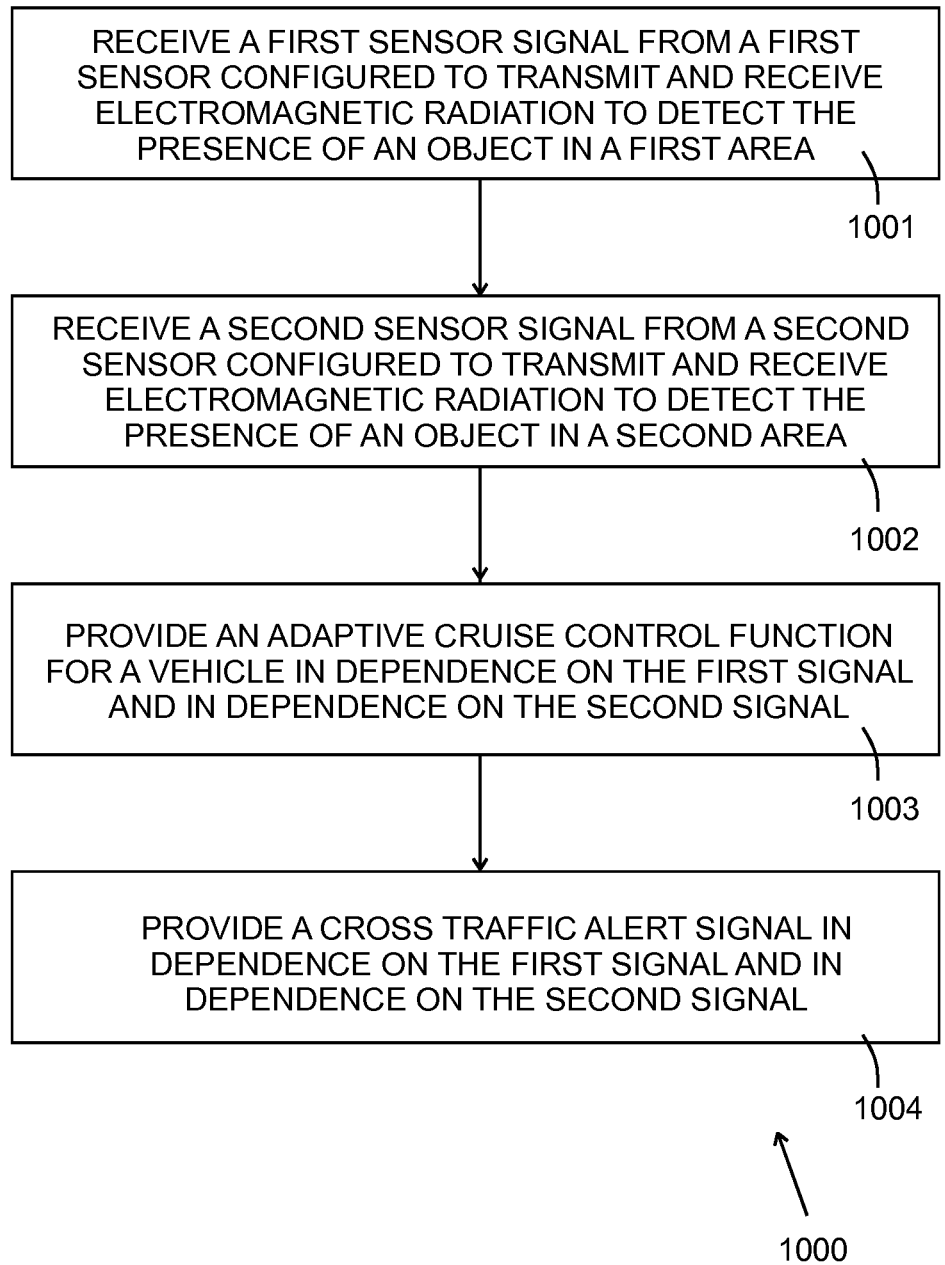
FIG. 10 shows a flowchart illustrating a method performable by the controller.

A method 1000 performable by the controller 802 of the vehicle 100 is illustrated by the flowchart shown in FIG. 10. At block 1001 of the method, a first sensor signal is received from a first sensor 107 that is configured to transmit and receive electromagnetic radiation to detect the presence of an object in a first area 109. Depending on the presence or absence of objects in the first area 109, the first sensor signal may indicate that an object is present in the first area 109 and provide an indication of the range, position and velocity of the object, or alternatively it may indicate that no objects are present.

At block 1002 of the method 1000, a second sensor signal is received from a second sensor 108 that is configured to transmit and receive electromagnetic radiation to detect the presence of an object in a second area 113. Depending on the presence or absence of objects in the second area 113, the second sensor signal may indicate that an object is present in the second area 113 and provide an indication of the range, position and velocity of the object, or alternatively it may indicate that no objects are present.

At block 1003 of the method 1000, an adaptive cruise control function is provided for the vehicle 100 in dependence on the first signal and in dependence on the second signal. For example, an output is provided to the powertrain control module 806 and/or the brake system 807 of the vehicle 100 to cause it (or them) to adjust the speed of the vehicle 100 in dependence on the first signal and/or the second signal indicating the position and velocity of vehicle ahead. For example, the first signal and/or the second signal may indicate that the vehicle ahead is accelerating away from the vehicle 100, in which case an output signal may be provided to the powertrain control module 806 and/or the brake system 807 to cause it (or them) to increase the speed of the vehicle 100, or alternatively the first signal and/or the second signal may indicate that a gap to a vehicle ahead is reducing towards a distance that would not be safe at the current speed of the vehicle 100, in which case an output signal may be provided to the powertrain control module 806 and/or the brake system 807 to cause it (or them) to decrease the speed of the vehicle 100.

At block 1004 of the method 1000, a cross traffic alert signal is provided in dependence on the first signal and in dependence on the second signal. For example, a cross traffic alert signal is provided in dependence on the first signal or the second signal indicating that an object detected by the first sensor 107 or the second sensor 108 is approaching the longitudinal axis 105 of the vehicle 100 at a velocity that might cause a collision with the vehicle 100.

Figure 11:
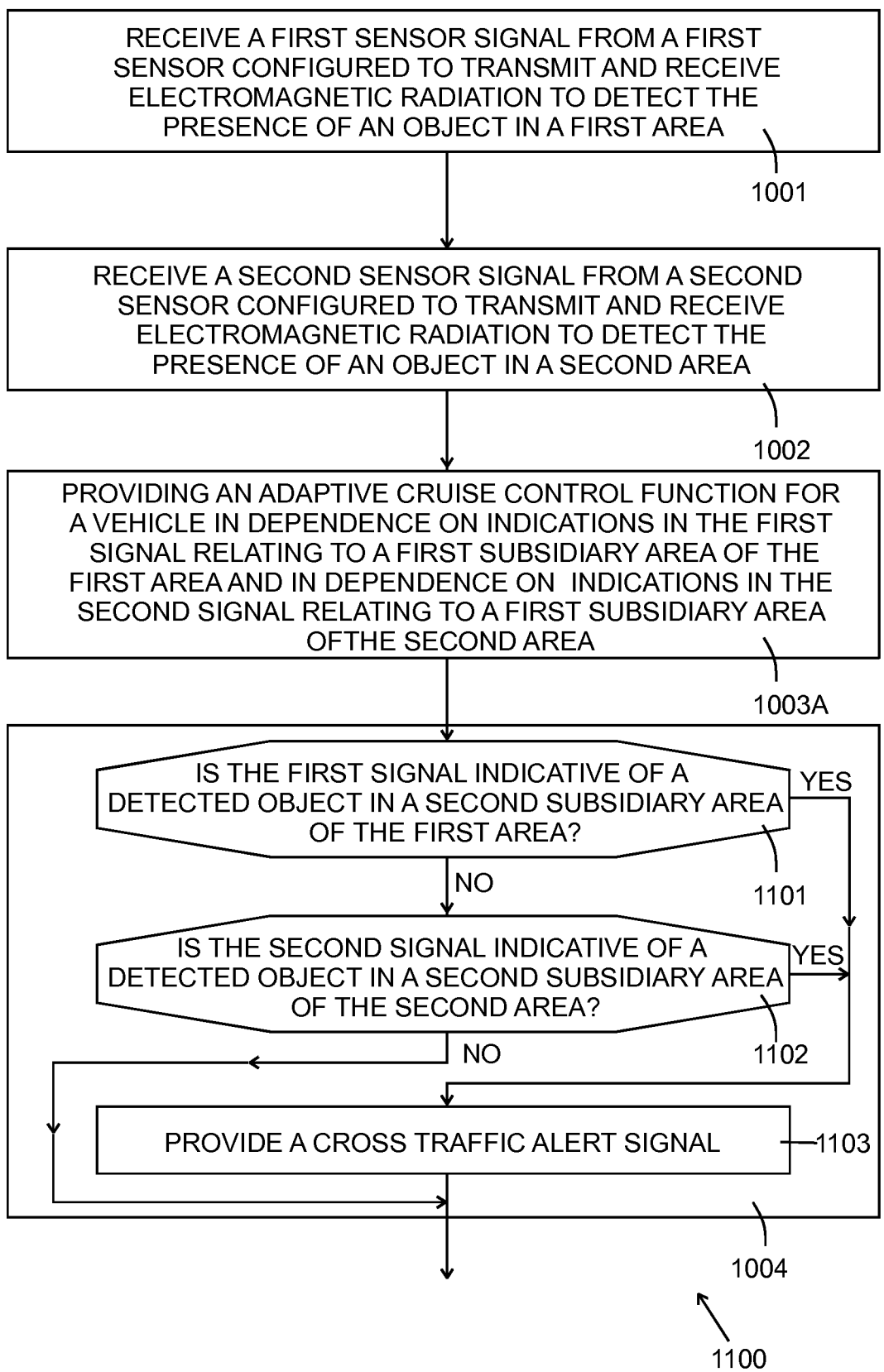
FIG. 11 shows a flowchart illustrating a more specific example of the method of FIG. 10.

A method 1100 providing a more specific example of the method 1000 is illustrated by the flowchart shown in FIG. 11. The processes at blocks 1001 and 1002 of the method 1100 are as described above with reference to FIG. 10. At block 1003A of the method 1100, an adaptive cruise control function is provided for a vehicle 100 in dependence on indications in the first signal relating to a first subsidiary area 301 of the first area 109 and in dependence on indications in the second signal relating to a first subsidiary area 304 of the second area 113. Thus the adaptive cruise control may cause adjustment of the speed of the vehicle 100 in dependence on the first signal indicating the presence of an object in the first subsidiary area 301 of the first area 109, and it may also cause adjustment of the speed of the vehicle 100 in dependence on the second signal indicating the presence of an object in the first subsidiary area 304 of the second area 113.

Within block 1004 of the method 1100, it is determined at block 1101 whether the first signal is indicative of an object detected in a second subsidiary area 302 of the first area 109 that has a velocity that could cause it to collide with the vehicle 100, and at block 1102 it is determined whether the second signal is indicative of an object detected in a second subsidiary area 305 of the second area 113 that has a velocity that could cause it to collide with the vehicle 100. If it is determined at either block 1101 or block 1102 that such an object is present, a cross traffic alert signal is provided at block 1103. The cross traffic alert signal may be used to cause an automatic change in the speed of the vehicle 100 to ensure a collision is avoided or to cause an audio signal to be produced to provide a warning to a user of the vehicle 100.

In the above described embodiment, the first sensor 107 is configured to detect the presence of an object within the overlapping area 117 independently of the second sensor 108, and the second sensor 108 is configured to detect the presence of an object within the overlapping area 117 independently of the first sensor 107. Thus, the adaptive cruise control system may cause an adjustment to the speed of the vehicle 100 in dependence on the first signal received from the first sensor 107 or the second signal received from the second sensor 108.

Figure 12:
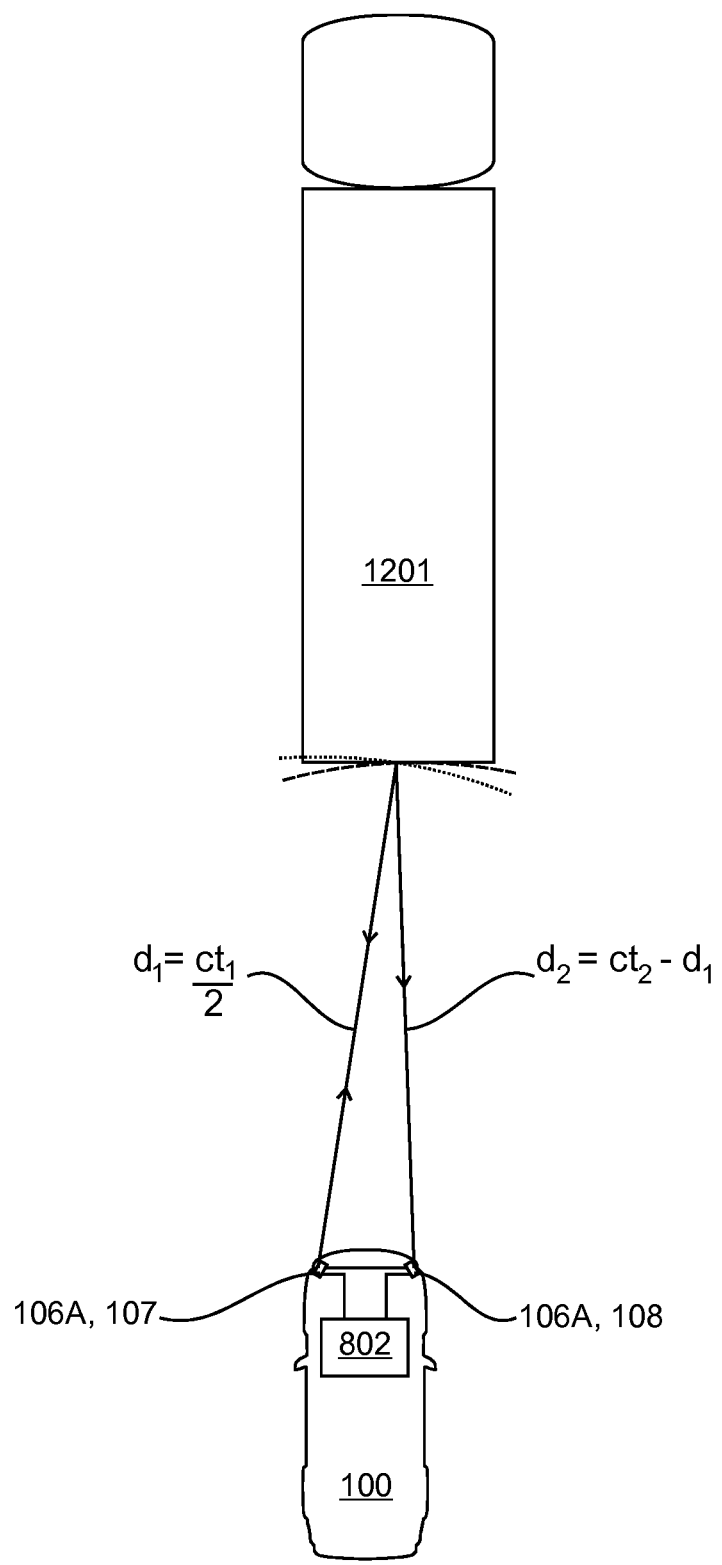
FIG. 12 shows an alternative apparatus in which measurement of the direction of an object is determined by trilateration.

However, in alternative apparatuses embodying the present invention, the sensors 107 and 108 are arranged to provide signals to the controller 802 to enable accurate measurement of the direction of an object to be determined by trilateration or a similar method. An example of such an alternative apparatus 106A is shown in FIG. 12. The sensors 107 and 108 of the apparatus 106A are arranged to provide signals to the controller 802 that are useable in a trilateration method to provide an accurate measurement of the direction of an object. The embodiment of FIG. 12 is like that previously described but both of the sensors 107 and 108 are arranged to detect electromagnetic radiation signals transmitted by just one of the sensors 107 and 108.

For example, the first sensor 107 may transmit an electromagnetic signal that reflects off a target 1201. A first distance ($d_1$) to the target 1201 from the first sensor 107 is determined by measuring a first time of the flight ($t_1$) of an electromagnetic radiation signal transmitted and received at the sensor 107. The first distance ($d_1$) is determined by multiplying the first time of flight ($t_1$) by the speed of light (c) and dividing by 2. A second distance ($d_2$) to the target 1201 from the second sensor 108 is determined by measuring a second time of the flight ($t_2$) of the electromagnetic radiation signal transmitted by the first sensor 107 but received at the second sensor 108 after being reflected off the target 1201. The second distance ($d_2$) may be determined by multiplying the second time of flight ($t_2$) by the speed of light (c) before subtracting the first distance ($d_1$).

To enable the second time of flight ($t_2$) to be measured, the operation of the sensors 107 is synchronised so that the second sensor 108 is informed of when the first sensor 107 emits its signals.

The angular position of the target 1201, for example from the first sensor 107, may then be determined from the distance between the two sensors 107 and 108, the first distance ($d_1$) from the first sensor 107 to the target 1201 and the second distance ($d_2$) from the second sensor 108 to the target 1201 using the cosine rule or a similar method.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application. For example, it will be appreciated that the trilateration calculations described with regard to FIG. 12 may be performed by the sensor controller 202 of the sensor 107 and/or the sensor 108 rather than the controller 802.

The blocks illustrated in the FIGS. 4, 10 and 11 may represent steps in a method and/or sections of code in the computer program 207 or computer program 902. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus for providing driver assistance of a vehicle, the apparatus comprising a first sensor and a second sensor mounted on a vehicle, wherein:
   the first sensor is configured to transmit and receive electromagnetic radiation to detect the presence of an object in a first area;
   the second sensor is configured to transmit and receive electromagnetic radiation to detect the presence of an object in a second area;
   the first area and the second area overlap to define an overlapping area forward of the vehicle;
   the first area extends from the overlapping area to a first extreme direction having a rearward component and a leftward component;
   the second area extends from the overlapping area to a second extreme direction having a rearward component and a rightward component;

the apparatus is configured to provide a signal to an adaptive cruise control system without providing any cross traffic alert signal when an object is detected in the overlapping area; and the apparatus is configured to provide a cross traffic alert signal when an object is detected by the first sensor in the first area but outside of the overlapping area or by the second sensor in the second area but outside of the overlapping area.

2. An apparatus according to claim 1, wherein the first sensor comprises a radar sensor or a lidar sensor.

3. An apparatus according to claim 1, wherein the first sensor is configured to:
  detect objects in the overlapping area up to a first distance; and
  detect objects in directions outside of the overlapping area only up to a second distance; and
  wherein the first distance is greater than the second distance.

4. An apparatus according to claim 1, wherein the first sensor is configured to transmit electromagnetic radiation with a first average power per unit angle in the overlapping area and to transmit electromagnetic radiation with a second average power per unit angle outside of the overlapping area; and the first average power per unit angle is greater than the second average power per unit angle.

5. An apparatus according to claim 1, wherein the first sensor is configured to: transmit electromagnetic radiation with a first power while transmitting in the overlapping area; and transmit electromagnetic radiation with a second power while transmitting in directions outside of the overlapping area, wherein the first power is greater than the second power.

6. An apparatus according to claim 1, wherein the first sensor is configured to: scan across the overlapping area at a first rate of change of angle; and scan outside of the overlapping area at a second rate of change of angle, wherein the first rate of change of angle is less than the second rate of change of angle.

7. An autonomous system for a vehicle, the autonomous system comprising the apparatus of claim 1 and a controller configured to provide output signals for controlling a speed of the vehicle in dependence on detection of an object in the overlapping area by the first sensor and/or the second sensor, wherein
  the autonomous system comprises the adaptive cruise control system, and
  the controller is configured to provide the cross traffic alert signal in dependence on detection of an object by the first sensor in the first area but outside of the overlapping area or by the second sensor in the second area but outside of the overlapping area.

8. An autonomous system according to claim 7, wherein the autonomous system comprises the adaptive cruise control system, and wherein the adaptive cruise control system has steer assist.

9. An autonomous system according to claim 7, wherein:
  the first sensor and second sensor are of a first type;
  the system comprises a third sensor of a second type; and
  the controller is configured to perform sensor fusion by combining received first data indicative of an object detected by the first sensor and/or the second sensor and second data received from the third sensor.

10. An autonomous system according to claim 9, wherein the third sensor comprises a camera.

11. A vehicle comprising the apparatus of claim 1.

12. A method of providing driver assistance of a vehicle, the method comprising:
  transmitting and receiving electromagnetic radiation to detect the presence of an object in a first area; and
  transmitting and receiving electromagnetic radiation to detect the presence of an object in a second area;
  wherein:
  the first area and the second area overlap to define an overlapping area forward of the vehicle;
  the first area extends from the overlapping area to a first extreme direction having a rearward component and a leftward component;
  the second area extends from the overlapping area to a second extreme direction having a rearward component and a rightward component;
  the detection of the presence of an object in the overlapping area causes a signal to be provided to an adaptive cruise control system without providing any cross traffic alert signal; and
  the detection of the presence of an object in the first or the second area but outside the overlapping area causes a cross traffic alert signal to be provided.

13. An autonomous system for a vehicle, the autonomous system comprising:
  a first sensor configured to transmit and receive electromagnetic radiation to detect the presence of an object in an overlapping area or a first non-overlapping area;
  a second sensor configured to transmit and receive electromagnetic radiation to detect the presence of an object in the overlapping area or a second non-overlapping area; and
  at least one controller configured to:
  provide an adaptive cruise control function for a vehicle without providing any cross traffic alert signal when an object is detected in the overlapping area by the first sensor and the second sensor; and
  provide a cross traffic alert signal when an object is detected in the first non-overlapping area by the first sensor or when an object is detected by the second sensor in the second non-overlapping area.

14. An autonomous system according to claim 13, wherein a first area, which includes the overlapping area and the first non-overlapping area, comprises a first subsidiary area and a second subsidiary area; a second area, which includes the overlapping area and the second non-overlapping area, comprises a first subsidiary area and a second subsidiary area; and the at least one controller is configured to:
  provide the adaptive cruise control function for the vehicle in dependence on detection of an object by the first sensor in the first subsidiary area of the first area and in dependence on detection of an object by the second sensor in the first subsidiary area of the second area; and
  provide the cross traffic alert signal in dependence on detection of an object by the first sensor in the second subsidiary area of the first area and provide a cross traffic alert signal in dependence on detection of an object by the second sensor in the second subsidiary area of the second area.

15. At least one controller comprising:
  at least one electronic processor having an electrical input for receiving a first signal indicating detection of the presence of an object in the first area and a second signal indicating detection of the presence of an object in the second area, and at least one electronic memory device electrically coupled to the electronic processor and having instructions stored therein, and a non-transitory computer readable medium comprising computer readable instructions, wherein the processor is configured to access the memory device and/or the non-transitory computer readable medium and execute the instructions stored therein such that it is operable to perform the method of claim 12.

* * * * *